United States Patent
Wilkens et al.

(10) Patent No.: US 11,828,029 B2
(45) Date of Patent: Nov. 28, 2023

(54) SYSTEM FOR MONITORING APPLICATION OF ROADWAY MARKING TAPE

(71) Applicant: EPIC Solutions, Inc., Fargo, ND (US)

(72) Inventors: Jeffrey Arnold Wilkens, West Fargo, ND (US); William Ricker, Billings, MT (US)

(73) Assignee: Epic Solutions, Inc., Fargo, ND (US)

( * ) Notice: Subject to any disclaimer, the term of this patent is extended or adjusted under 35 U.S.C. 154(b) by 599 days.

(21) Appl. No.: 17/029,374

(22) Filed: Sep. 23, 2020

(65) Prior Publication Data
US 2022/0090333 A1 Mar. 24, 2022

(51) Int. Cl.
*E01C 23/01* (2006.01)
*B60K 35/00* (2006.01)
*E01C 23/18* (2006.01)
*H04Q 9/00* (2006.01)
*G07C 5/08* (2006.01)

(52) U.S. Cl.
CPC .............. *E01C 23/01* (2013.01); *B60K 35/00* (2013.01); *E01C 23/185* (2013.01); *G07C 5/085* (2013.01); *H04Q 9/00* (2013.01); *B60K 2370/12* (2019.05); *B60K 2370/152* (2019.05); *H04Q 2209/40* (2013.01)

(58) Field of Classification Search
CPC ....... E01C 23/01; E01C 23/185; B60K 35/00; B60K 2370/12; B60K 2370/152; G07C 5/085; H04Q 9/00; H04Q 2209/40
USPC .......................................... 404/75, 84.05, 94
See application file for complete search history.

(56) References Cited

U.S. PATENT DOCUMENTS

| | | |
|---|---|---|
| 2,546,308 A | 3/1951 | Kahler |
| 3,717,540 A | 2/1973 | Henc |
| 3,886,011 A | 5/1975 | Eigenmann |
| 3,964,559 A | 6/1976 | Eigenmann |
| 3,964,835 A | 6/1976 | Eigenmann |
| 4,030,958 A | 6/1977 | Stenemann |
| 4,242,173 A | 12/1980 | Stenemann |
| 4,313,780 A | 2/1982 | Ford, Jr. |
| 4,317,696 A | 3/1982 | Hutchinson et al. |
| 4,376,007 A * | 3/1983 | Eigenmann ............. E01C 23/07 156/499 |
| 4,824,516 A | 4/1989 | Ishihara et al. |
| 5,599,133 A | 2/1997 | Costello et al. |

(Continued)

FOREIGN PATENT DOCUMENTS

EP 2366833 B1 3/2016

OTHER PUBLICATIONS

Jiang, Yi, "Durability and Retro-Reflectivity of Pavement Marking (Synthesis Study)," 2008, Purdue University Purdue e-Pubs. pp. 4-14.

*Primary Examiner* — Raymond W Addie
(74) *Attorney, Agent, or Firm* — Russell Manning; FisherBroyles, LLP

(57) ABSTRACT

A system for monitoring physical and/or environmental conditions during application of roadway marking tape. The system includes a data logging system that is operative to monitor one or more environmental parameters and geographical location during application of roadway marking tape. The data logging system generates a record of the parameters indexed to location. The record may be used to ensure application compliance and/or allow a user to alter one or more application parameters to ensure application compliance.

20 Claims, 7 Drawing Sheets

(56) References Cited

U.S. PATENT DOCUMENTS

| | | |
|---|---|---|
| 5,772,359 A | 6/1998 | Marty |
| 5,800,668 A | 9/1998 | Bumb |
| 5,865,943 A | 2/1999 | Marty |
| 5,911,362 A | 6/1999 | Wood et al. |
| 6,413,013 B1 | 7/2002 | Requena |
| 6,439,473 B1 | 8/2002 | Meyer et al. |
| 6,729,706 B1 | 5/2004 | Patton et al. |
| 6,913,417 B2 | 7/2005 | Lind et al. |
| 7,957,841 B2 | 6/2011 | Zarowny et al. |
| 8,880,362 B2 | 11/2014 | Wilkens et al. |
| 9,284,699 B1 | 3/2016 | Arnold |
| 9,726,168 B2 | 8/2017 | Wilkens et al. |
| 10,208,746 B2 | 2/2019 | Wilkens et al. |
| 10,865,530 B2 | 12/2020 | Wilkens et al. |
| 10,876,261 B2 | 12/2020 | Wilkens et al. |
| 2003/0157262 A1 | 8/2003 | Cebola |
| 2003/0177978 A1 | 9/2003 | Nobutoh et al. |
| 2004/0129387 A1 | 7/2004 | Ibrahim et al. |
| 2005/0127088 A1 | 6/2005 | Gardos |
| 2008/0271674 A1 | 11/2008 | Rademacher et al. |
| 2008/0300727 A1 | 12/2008 | Zarowny et al. |
| 2011/0229265 A1* | 9/2011 | Schottka ............... E01C 23/185 404/94 |
| 2012/0012684 A1 | 1/2012 | Mansheim et al. |
| 2013/0022397 A1 | 1/2013 | Ringus et al. |
| 2014/0377001 A1 | 12/2014 | Gassman |
| 2015/0377615 A1 | 12/2015 | Lake |

\* cited by examiner

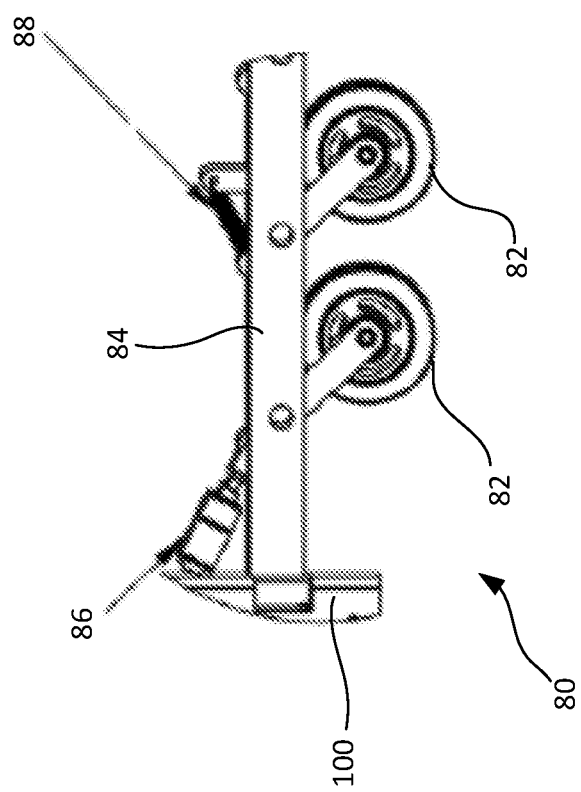

SYSTEM FOR MONITORING APPLICATION OF ROADWAY MARKING TAPE

FIELD

The present disclosure relates to applying roadway marking tape. More particularly, the disclosure relates to a system for monitoring physical and/or environmental conditions during roadway marking tape application for application compliance.

BACKGROUND

Roadways, crosswalks, parking lots, airports and other types of roadway surfaces often include various markings (e.g., lines, intermittent stripes, labels, words, etc.) to guide vehicle traffic, pedestrians, etc. Roadway marking materials (e.g., paints, tapes, thermoplastics, etc.) are frequently used to create visible stripes or lines. Due to the extended lengths of certain roadway markings, such as a highway centerline, applying paint is typically the most cost-effective way to mark roadway surfaces. However, in some applications, it is desirable to apply a premade roadway marking tape (e.g., reflective tape) to a roadway surface. Though typically more expensive, such marking tapes may be desirable in locations of heavy use and/or where improved reflective qualities are desired.

Roadway marking tapes are typically applied using a specialized tape applicator. Such applicators typically utilize a roller which rests against the pavement surface and applies pressure to the top side (i.e., non-adhesive) of the marking tape to press an adhesive side of the marking tape against the ground. Commonly, contractors apply such marking tapes for municipal and/or state agencies. The pre-made marking tapes are acquired from various manufacturers. During application, contractors are typically required to apply the premade marking tapes in compliance with various governmental requirements. In addition, manufacturers of the pre-made tapes often have various application specifications for the premade tapes. Along these lines, the manufactures sometimes provide a warranty for their products, which may be voided if the premade tapes are not applied in accordance with tape-specific specifications.

SUMMARY

Aspects of the present disclosure are based on the realization that difficulties arise in determining if roadway marking tape is applied in compliance with various regulations and/or specifications. Accordingly, provided herein is a system, apparatus and/or method (i.e., utility or utilities) for monitoring various physical and/or environmental parameters to ensure roadway marking tapes are applied in accordance with, for example, government regulations and/or manufacturer specifications. Such information may be collected to provide an audit record of the applied marking tapes. Additionally, such information may be collected and output to a contractor to allow the contractor to monitor compliance of tape application during application. In the latter regard, a contractor may make necessary adjustments during application to remain in compliance with such regulation and/or specifications.

In arrangement, a marking tape application utility is provided. The utility includes a tape applicator configured to apply roadway marking tape to a roadway surface as the tape applicator travels over the roadway surface. The utility includes one or more environmental sensors configured to measure environmental conditions present while the marking tape is applied. Such environmental sensor may include, without limitation, a roadway surface moisture sensor, an ambient temperature sensor, a roadway surface temperature sensor and a humidity sensor. Other sensors are possible. The utility also includes a location sensor configured to identify a geographic location of the tape applicator while the applicator is applying roadway marking tape to a roadway surface. A controller operatively connected to the environmental sensors and the location sensor is configured to store sensor outputs indexed to a geographical location output received from the location sensor. That is, the controller is configured to generate a record of environmental conditions indexed to geographical locations. The record may be updated periodically or based on a distance traveled.

In an arrangement, the utility may incorporate one or more physical sensors. Such physical sensors may include a speed sensor and/or a compressions sensor. The speed sensor may generate an output corresponding to a speed the tape applicator passes over a roadway surface while applying marking tape to the surface. The compression sensor may generate an output indicative of a compression pressure applied to the roadway marking tape after the marking tape is applied to the roadway surface. The outputs from the physical sensors may be incorporated into the record.

In an arrangement, the controller may include a wireless and/or network interface. Such an interface may be utilized to acquire data (e.g., weather data) and/or to transmit data (e.g., recorded data). In the former regard, such data may be incorporated into the record. In the latter regard, data may be sent to the cloud for storage. Alternatively, data may be sent to a regulatory body and/or manufacturer for compliance monitoring.

In a further arrangement, the controller may be configured to compare monitored parameters (e.g., environmental and/or physical) to predetermined thresholds to determine compliance or non-compliance.

BRIEF DESCRIPTION OF THE DRAWINGS

For a more complete understanding of the present disclosure and further advantages thereof, reference is now made to the following detailed description taken in conjunction with the drawings in which:

FIG. 7 illustrated a taper assembly that may be utilized with a tape applicator in accordance with the present disclosure.

Figure 1:
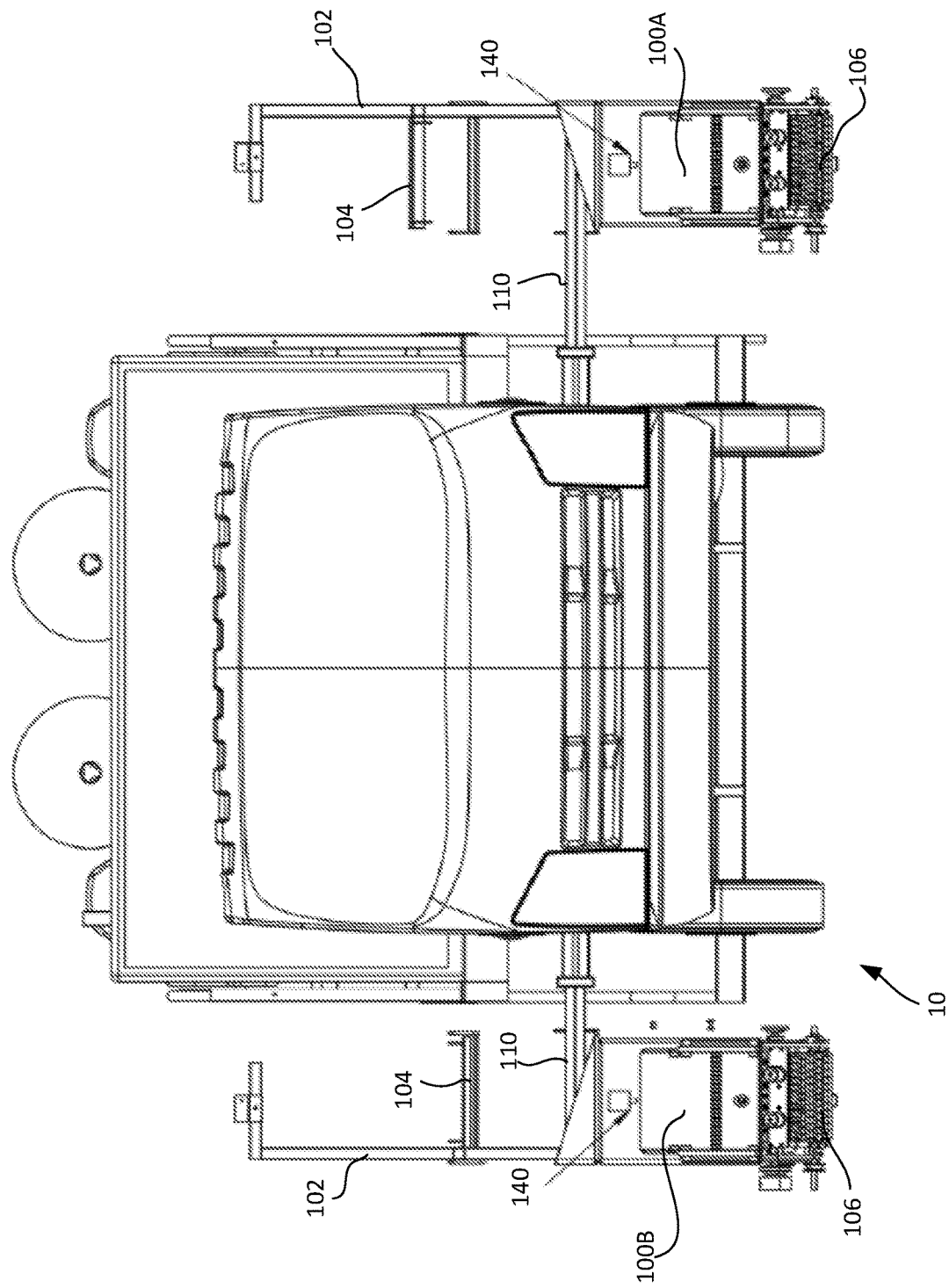
FIG. 1 illustrates a front view of a roadway marking tape applicator vehicle.

While the invention is susceptible to various modifications and alternative forms, specifics have been shown by way of example in the drawings and will be described in detail below. It should be understood that the intention of the detailed description is not to limit aspects of the invention to the particular embodiments described. Rather, the invention covers all modifications, equivalents, and alternatives falling within the spirit and scope of the invention.

DETAILED DESCRIPTION

Reference will now be made to the accompanying drawings, which at least assist in illustrating the various pertinent features of the presented inventions. The following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

Figure 2:
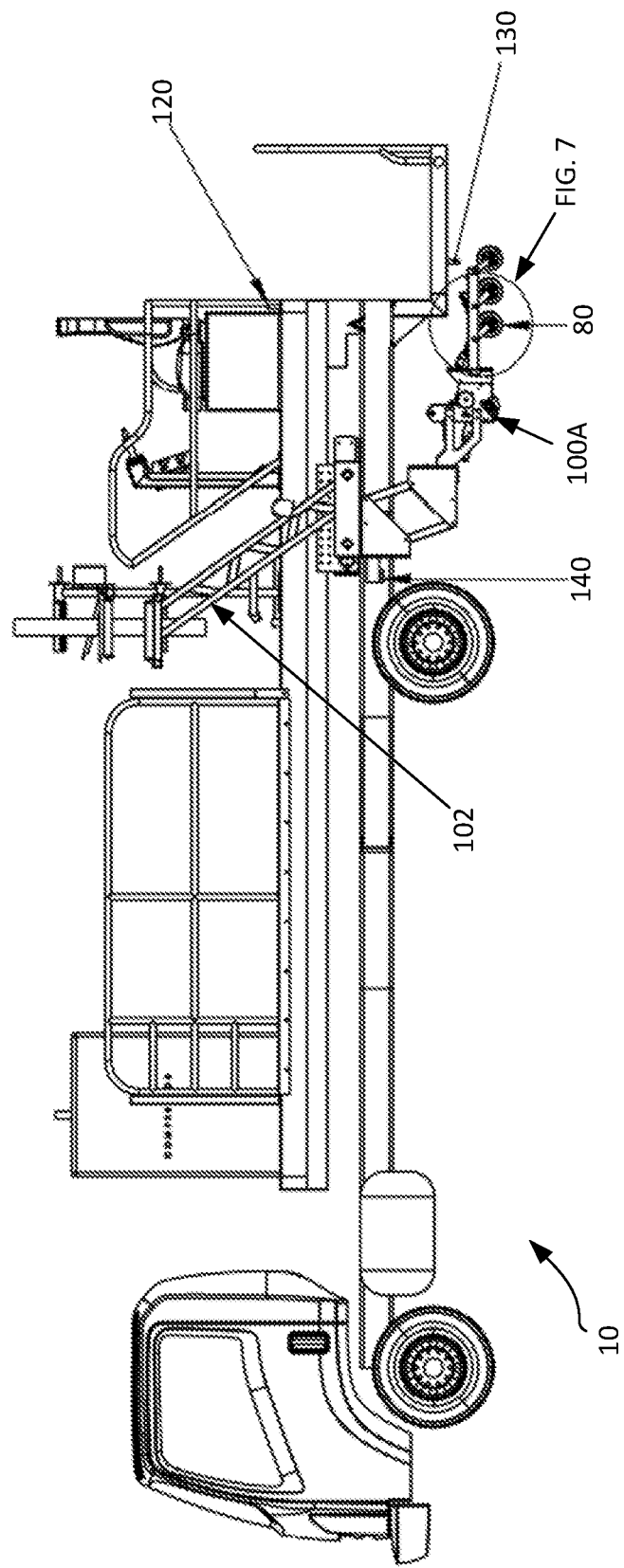
FIG. 2 illustrates a side view of the tape applicator vehicle of FIG. 1.
Figure 3:
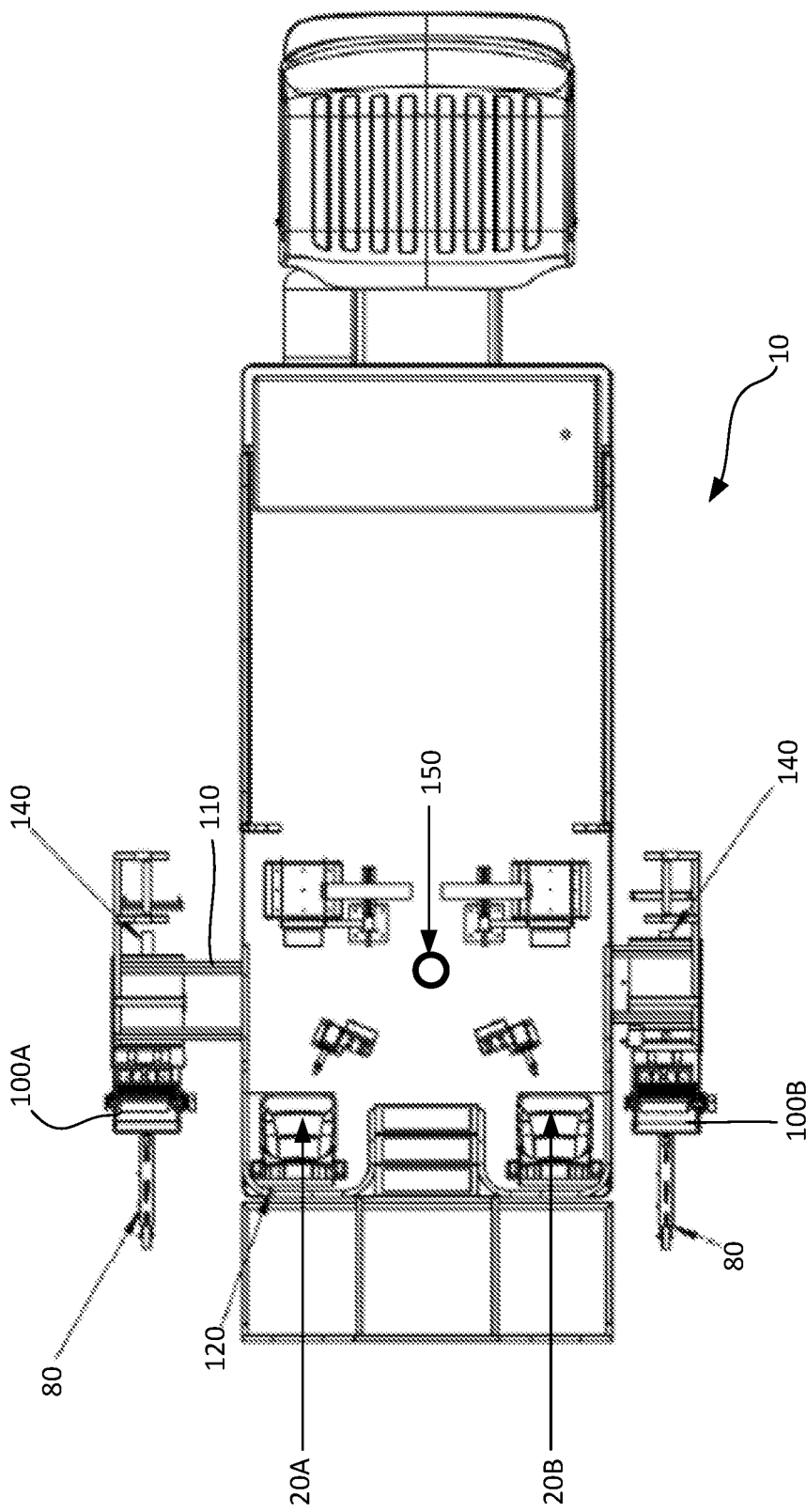
FIG. 3 illustrates a top view of the tape applicator vehicle of FIG. 1.

FIGS. 1, 2 and 3 illustrate, front, side and top views, respectively, an exemplary embodiment of a marking tape application truck or vehicle 10. In the illustrated application, the vehicle 10 is adapted to apply roadway marking tape (e.g., reflective marking tape) to a roadway surface while the truck travels over the roadway surface. In the illustrated embodiment, the application vehicle 10 is a flatbed truck that supports first and second tape applicators 100A and 100B (hereafter 100 unless specifically referenced) on opposite sides of the vehicle. The tape applicators 100 are each configured to compress an adhesive side of a marking tape to a roadway surface. In the illustrated embodiment, the application vehicle includes first and second user control stations 20A, 20B mounted on the bed of the truck. Operators utilize each station to control the application of marking tape to a correct location on the roadway surface. Though shown on flatbed truck, it will be appreciated that the monitoring and compliance system(s) (e.g., data logging system) disclosed herein have broader application and may be utilized on walk behind tape units as well as ride-on units (collectively, "tape application vehicles"). All discussion relating to the application vehicle as a truck is for purposes of discussion and not by way of limitation.

Mounted to at least a first side of the vehicle is a tape applicator 100. In the illustrated embodiment, the tape applicator 100 attaches to a carriage 110 that allows and operator to move the applicator 100 to and away from a centerline of the vehicle 10 to allow an applied tape to, for example, follow a straight line if the vehicle slightly deviates slightly from a straight path. A frame 102 connected to the tape applicator 100 supports a number of rollers, spindles, etc., which support one or more rolls of roadway marking tape prior to their application to a roadway surface. That is, one or more rolls of roadway marking tape may be installed on various supply spindles 104 and fed through the tape applicator 100. Additionally, the roadway marking tape may be fed from spindles located in the bed of the truck. To feed the roadway marking tape into the tape applicator, the roadway marking tape from a supply spindle may pass over various rollers (e.g., tensioning rollers; not shown) which aid in maintaining a suitable level of tension on the roadway marking tape as it is being drawn into the tape applicator 100.

After the marking tape enters the tape applicator 100, a feed mechanism directs the pavement marking through the interior of the tape applicator. The feed mechanism may include a number of rollers which engage the pavement marking tape. The various rollers of the feed mechanism may comprise ridges, sprockets, teeth, or the like to reduce to the surface area which contacts the adhesive side of the tape to prevent binding or sticking of the tape on the feed mechanism rollers. In any arrangement, the feed mechanism directs that marking tape to an adhesion roller 106 such that a non-adhesive surface engages a portion of the outer periphery of the adhesion roller. The adhesion roller 106 may then press an exposed adhesive surface of the roadway marking tape to a roadway surface. This adheres the marking tape to the roadway surface.

The tape applicator 100 may also include a cutting mechanism (not shown). The cutting mechanism typically includes one or more blades and actuators. The actuator selectively advances the blade through the marking tape to cut the marking tape at desired lengths. Such an arrangement permits applying the marking tape in desired configuration (e.g., skip lines etc.). One embodiment of a tape applicator that may be utilized with the presented system is set forth in co-owned U.S. Patent Publication No. 2020-0157750, the entire contents of which is incorporated herein by reference.

As noted above, application of roadway marking tape is often subject to various governmental regulations and/or manufacturer specifications. That is, the application of roadway marking tape is subject to various application parameters. Such application parameters may include, without limitation, air/ambient temperature, roadway surface temperature (e.g., minimum and/or maximum), moisture levels (e.g., humidity, dew point, surface moisture), speed of applicator (e.g., maximum) and/or compression applied to the marking tape. By way of example, current air and surface temperatures may have an application minimum temperature parameter of 40° F. and rising with an overnight air temperature of no less than 40° F. Likewise, a moisture parameter may require no precipitation within the last 24 hours and a maximum surface moisture percentage. Of note, adherence to the application parameters, which may be specific to specific marking tapes, is of importance to ensure the marking tape remains adhered to the roadway surface for its intended lifetime. That is, adherence of marking tape outside of the application parameters may result in premature delamination of the marking tape. Current applications procedures rely on the operator/contractor applying the marking tapes to ensure that these application parameters are being followed. There is no system or methodology in place to confirm marking tape is applied according to required application parameters. For large jobs, tape manufacturers sometimes have representatives on-site to ensure compliance with application parameters. However, the presence of on-site representatives is not feasible for all applications.

Provided herein is a data logging system and method for monitoring physical and/or environmental parameters to ensure compliance with various roadway marking tape application parameters. The system and method are operative to generate a record that correlates, location, time, environmental conditions and/or physical application parameters (e.g., compression) as roadway marking tape is applied to a roadway surface. The record may provide an audit trail ensuring application parameters were met during application. Alternatively/additionally, the system and method may compare currently monitored parameters to application parameters (e.g., benchmarks, thresholds, etc.) and generate real-time feedback (e.g., within seconds) to an operator. For instance, the system and method may alert an operator that one or more monitored parameters is outside a required application parameter allowing the operator to take necessary remedial actions.

The data logging system described herein combines location data with one or more sensor readings that are acquired during application of a marking tape. Without limitation, the sensor readings may include ambient temperature, humidity, roadway surface temperature, roadway surface moisture and/or application speed. One or more of sensor readings/outputs may be stored to an electronic record that is indexed to location information that identifies the geographic location where the sensor readings were acquired. That is, the electronic record identifies the conditions present when marking tape is applied at a given location. Further, such a record will typically include a time stamp indicating when the readings were acquired. Most commonly, the electronic record is updated periodically (e.g., every 10 seconds, 30 seconds etc.) or based on distance traveled (e.g., every 30 feet, 100 feet, etc.). By way of example, the record may be updated every 10 seconds to provide a highly granular record of marking tape application.

Referring to FIGS. 1-3, the illustrated embodiment of the application vehicle includes a number of environmental sensors that are part of the data logging system. The system incudes an ambient temperature sensor 120 that is preferably mounted above the truck bed to at least partially isolate the temperature sensor from the roadway. The system also includes a roadway surface temperature sensor 130 mounted to is undercarriage. The roadway surface temperature sensor 130 is configured to obtain a temperature measurement of the roadway surface proximate to the location of the tape applicator 100. The roadway temperature sensor may be any contact or non-contact temperature sensor including, without limitation, an infrared temperature sensor or a laser sensor. What is important is that the roadway temperature sensor is capable of taking a measurement of the roadway surface proximate to where the marking tape is applied. The system may further include a roadway moisture sensor 140 that is mounted in front of the tape applicator 100 and focused on the roadway surface where the marking tape will be applied. The roadway moisture sensor is a contact or non-contact sensor that measures a surface moisture percentage on the roadway surface while the vehicle is moving over the roadway surface. In one non-limiting embodiment, the roadway moisture sensor 140 is a near infrared moisture meter. This set of sensors may generally be referred to as environmental sensors as they measure environmental conditions. Of note, additional environmental sensors may be incorporated in the data logging system. For instance, a humidity sensor may be incorporated. In any arrangement, the sensors generate outputs of the parameter(s) they measure. Such outputs may be recorded and/or utilized to calculate additional environmental information (e.g., dew point, etc.).

In addition to the environmental sensor(s), the data logging system may include one or more physical sensors that measure physical parameters. Primary amongst the physical sensors is a location sensor 150 that allows for determining a location of the vehicle and outputting an indication of this location for incorporation into an electronic record. Any location methodology may be utilized including tracking systems such as the Global System for Mobile Communications (GSM) that utilize cellular network infrastructure to track mobile phones, Global Positioning System (GPS) for GPS sensors and/or combined systems that utilize both cellular network data and GPS to determine location. In the illustrated embodiment, the data logging system includes a GPS receiver that forms the location sensor 150. In most embodiments, the data logging system will also include a speed sensor 160 that outputs a current speed of the application vehicle. Such a speed sensor may be incorporated into a wheel of the vehicle or may be a stand-alone sensor that utilizes any appropriate methodology (e.g., radar, laser, etc.) to calculate vehicle speed, which correlates to the application speed of the marking tape. The physical sensors may also include a pressure/compression sensor 170 that outputs a measurement of a compression pressure that is applied to the marking tape after it is adhered to the roadway surface, as is further discussed below.

Figure 4:
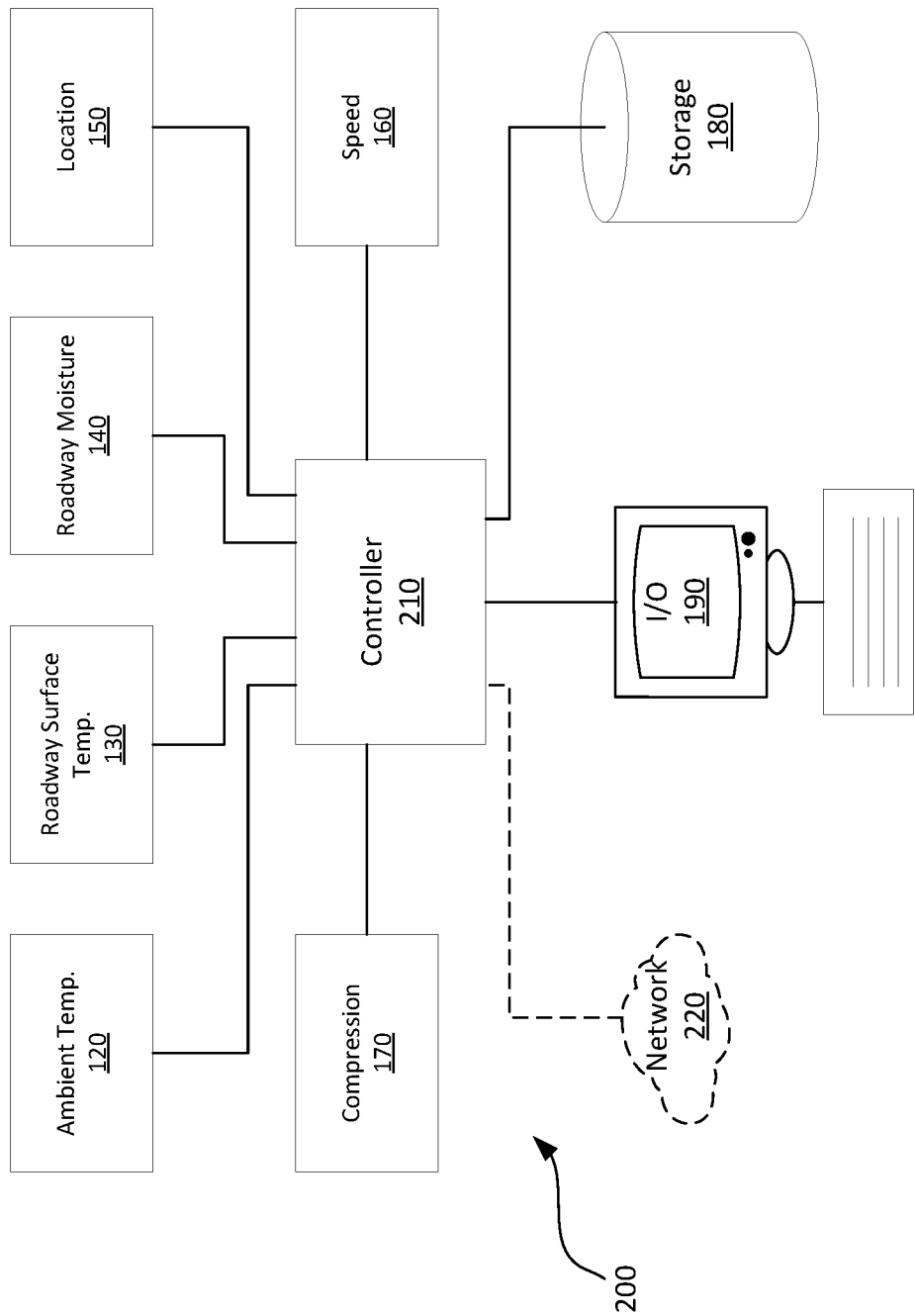
FIG. 4 illustrates a diagram of a data logging system.

FIG. 4 illustrates a diagram of one embodiment of the data logging system 200. As illustrated, each of the sensors, the ambient temperature sensor 120, the roadway surface temperature sensor 130, the roadway moisture sensor 140, the location sensor 150, the speed sensor 160 and, if utilized, the compression sensor 170 are each connected to a controller 210. That is, the various sensors provide outputs to the controller 210 or provide outputs to the controller upon request. The controller 210 is configured to record outputs (e.g., periodically) from each of the sensors to generate a record of current parameters monitored during application of marking tape to a roadway surface. The system may also include a database or storage 180 where acquired data may be stored. Though illustrated as having five sensors, it will be appreciated that the data logging system may have more or fewer sensors. In various embodiments, the data logging system 200 may also include and input/output device 190 such as a monitor and keyboard, laptop computer, tablet, etc. The I/O device 190 may be located at a control station 20 and/or in a cab of an application vehicle. The I/O device 190 may allow a user to initiate operation of the system. Likewise, the I/O device 190 may provide real-time outputs of monitored parameters to an operator.

In the illustrated embodiment, the data logging system 200 is optionally connectable to a network 220 via a network interface. Such a network connection enables the system 200 to report acquired data to, for example, a state regulatory body and/or tape manufacturer. Likewise, such data may be sent to the cloud for storage in a designated database. Further, such a network connection may allow the system 200 to acquire weather information that may be incorporated into a record or report. By way of example, the system may acquire weather data from a designated weather database (e.g., National Oceanic and Atmospheric Administration, etc.) for a given geographic location for a 24 hour period prior to application. Such weather information may identify if, for example, overnight temperatures were above a designated minimum level. Likewise, such weather information may identify if there has been precipitation during a predetermined previous time period.

In operation, the data logging system 200 is configured to store sensor outputs to a record that may be updated periodically. Table 1 illustrates one exemplary embodiment of a data record that may be generated during application of roadway marking tape.

TABLE 1

| Time | Location | Ambient Temp ° F. | Road Temp ° F. | Road Moisture % | Speed MPH |
|---|---|---|---|---|---|
| 20:07:30 | Lat 40.173922 Long −105.010539 | 75 | 92 | 0.5% | 5.3 MPH |
| 20:09:00 | Lat 40.173873 Long −105.010539 | 75 | 92 | 0.5% | 5.2 MPH |
| 20:10:30 | Lat 40.173856 Long −105.010539 | 75 | 93 | 0.5% | 5.3 MPH |
| 20:12:00 | Lat 10.173824 Long −105.010539 | 75 | 93 | 0.5% | 5.4 MPH |

In this exemplary embodiment, the data logging system indexes measurement of location, ambient temperature, surface moisture and application speed to a time stamp. In this specific embodiment, sensor measurements are recorded every minute and a half. However, any time period may be utilized and may be adjusted by an operator. For each set of measurements, the data logging system acquires a GPS coordinate of the tape application vehicle as wall as measurements of temperatures, surface moisture and vehicle speed. Such a record may be initiated at the beginning of an application run and may be terminated at the end of such an application run.

Figure 5:
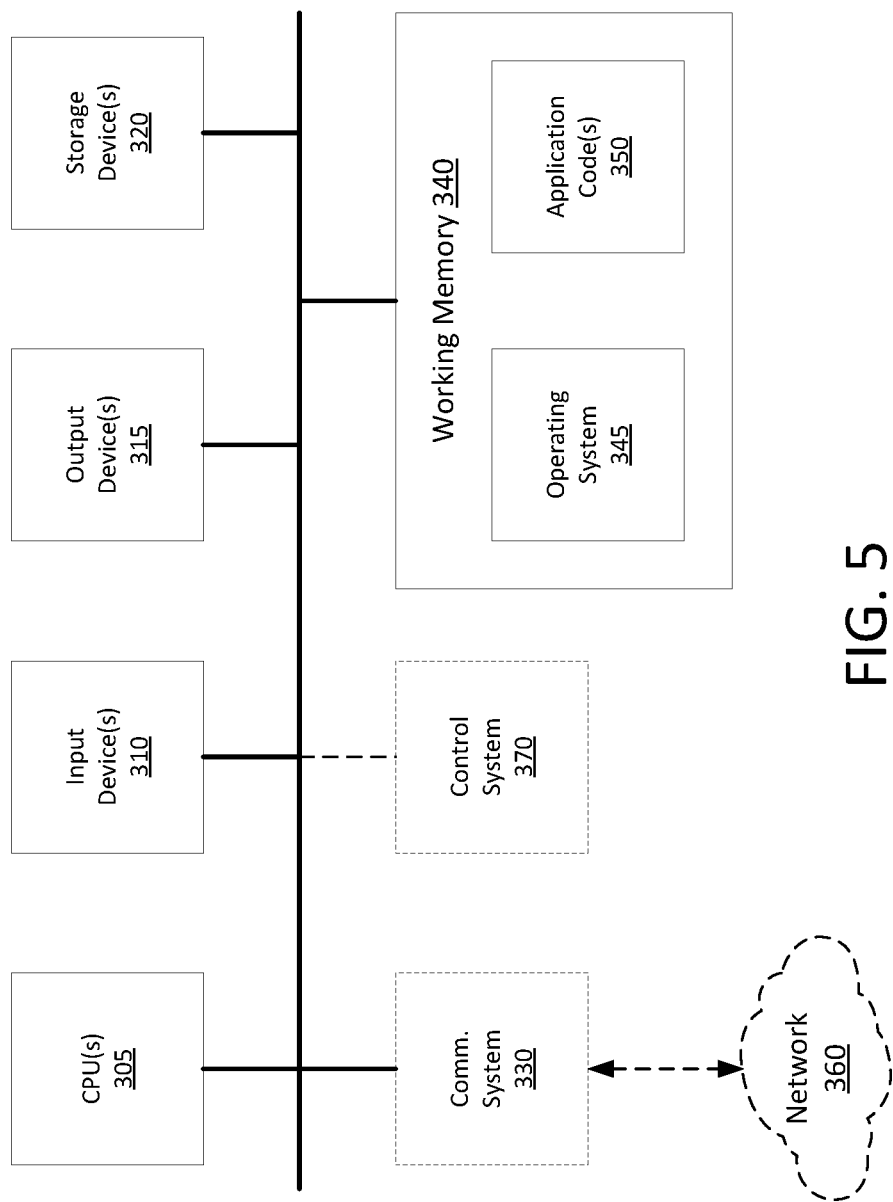
FIG. 5 illustrates an exemplary computational system for implementing functionality of the data logging system.

FIG. 5 shows an illustrative computational system 300 for implementing functionality of the data logging system 200, according to various embodiments. The computational system 300 can include or perform functionality of components of the data logging system, such as those described above. For the sake of simplicity, the computational system 300 is shown including hardware elements that can be electrically coupled via a bus 355. However, embodiments of the computational system 300 can be implemented in other arrangements. The hardware elements can include one or more central processing units (CPUs) 305 one or more input devices 310 (e.g., a mouse, a keyboard, a display, etc.), and one or more output devices 315 (e.g., a display, etc.). The computational system 300 can also include one or more storage devices 320. By way of example, storage device(s) 320 can be disk drives, optical storage devices, solid-state storage device such as a random access memory (RAM) and/or a read-only memory (ROM), which can be programmable, flash-updateable and/or the like. One or more of these devise may be non-transitory computer readable media for storing instructions (e.g., programs) for operating the system.

The computational system 300 can additionally include a communications system 330 (e.g., including a modem and a network card (wireless or wired). The communications system 330 can permit data to be exchanged with a network 360. For example, weather information (e.g., past 24 hours of temperatures and precipitation for a specified location) can be requested by and communicated to the computational system 300 via the communications system 330 to the network 360.

The computational system 300 can also include software elements, shown as being currently located within a working memory 340, including an operating system 345 and/or other code 350, such as an application program. In some embodiments, one or more functions of the data logging system 200 are implemented as application code(s) 350 in working memory 340. Some embodiments further include a control system 370 to control various mechanical features of the system 200. For example, the mechanical control system 370 can fully or partially control operation of a compression device as set forth below.

Figure 6:
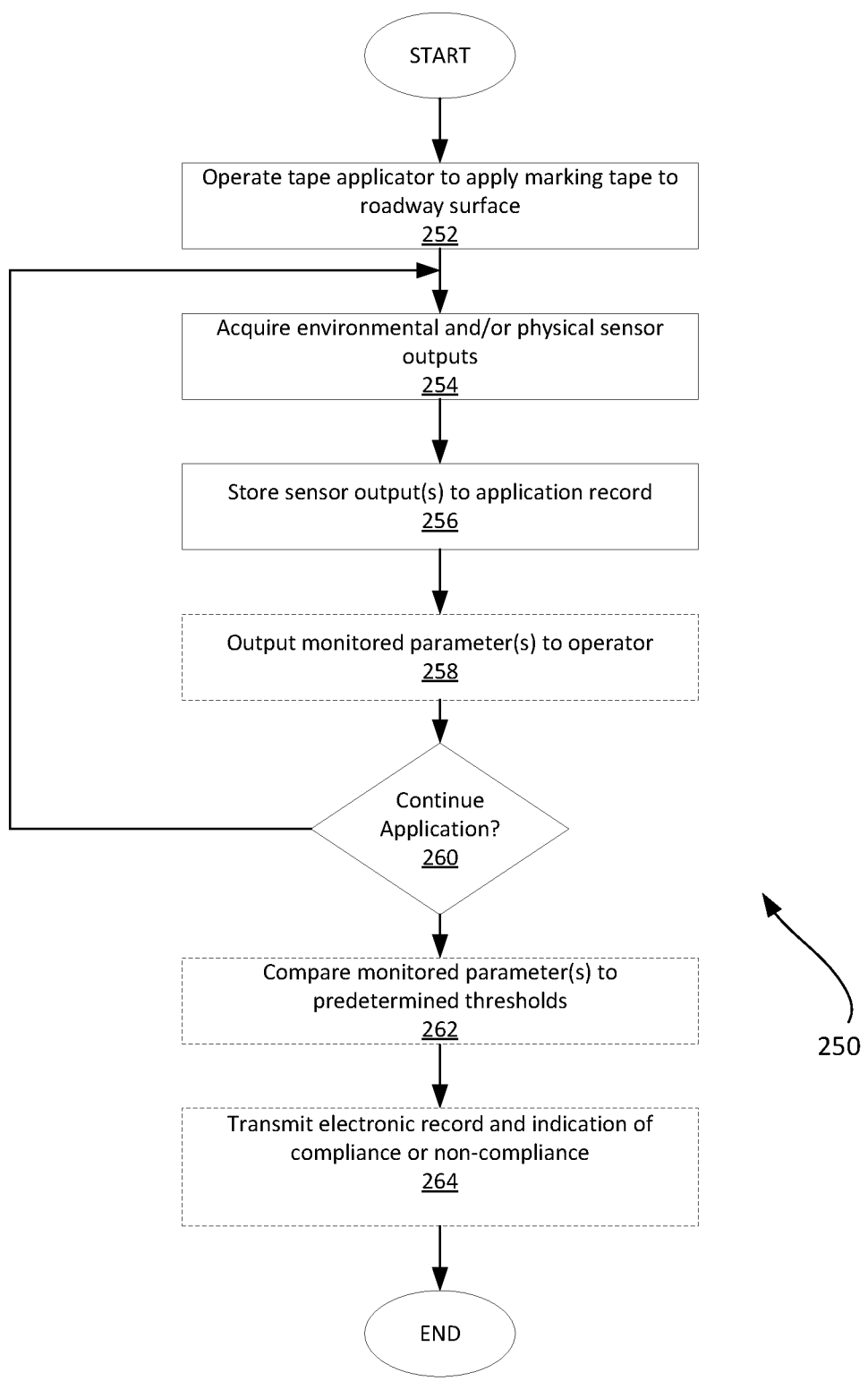
FIG. 6 illustrates a protocol of the data logging system.

FIG. 6 illustrates one protocol 250 that may be stored by and implemented by the computation system to implement the data logging system 200. Initially, the protocol 250 may be started either manually or upon initiation of the tape applicator. One initiated, the tape applicator is operated 252 to apply the marking tape to a roadway surface. In conjunction with the operation of the tape applicator, the system may acquire sensor outputs 254 from the environmental and/or physical sensors. The sensor output may be stored 256 to an application record that indexes the various sensor readings to a time and/or location. In an optional step, the system may output 258 the monitored parameters to an operator. This may allow an operator to make adjustments and/or terminate application if the parameters are outside predetermined threshold ranges. Once a set of sensor outputs are acquired and stored, a determination 260 may be made regarding continued marking tape application. If marking tape continues to be applied, another set of measurements may be acquired and stored (e.g., periodically, etc.). Once tape application ceases, acquisition of additional sensor measurement may cease. At this time, an electronic record is generated that corresponds to the application of roadway marking tape over a roadway surface. The protocol may further entail comparing 262 one or more of the recorded parameters to predetermined application parameters to determine if the roadway marking tape is or is not in compliance with the application parameters. Further, the protocol may entail transmitting 264 an indication of compliance or non-compliance. For instance, the electronic record and/or its comparison with predetermined thresholds may be transmitted via the network interface to a regulatory body and or tape manufacturer.

As noted above, in various embodiments, the data logging system may incorporate a compression reading into the recorded data. Such a compression reading may correspond to a compression pressure applied to the roadway marking tape after it is applied to a roadway surface to ensure that the marking tape bonds to the surface. In current practice, most tape manufacturers require that their marking tape be 'tamped' to ensure proper bonding. Most commonly, this it performed by contractors driving one or more follow vehicles over the tape to ensure a specified number of wheels pass over the tape. Typically, use of a follow vehicle(s) is sufficient to compress the marking tape against the roadway surface. However, a concern remains as to if this procedure is being followed. That is, there is currently no way to ensure compliance with this application parameter. To alleviate such concerns, the present disclosure also discloses a tamper 80 that may be incorporated with a tape application vehicle to ensure that a marking tape is properly tamped to the roadway surface.

The tamper 80 is best illustrated in FIGS. 2, 3 and 7. In the illustrated embodiment, the tamper 80 is configured to attach to the tape applicator 100 and/or the tape applicator vehicle. In other embodiments, the tamper may be a separate unit that may communicate with the data logging system via a wireless connection (e.g., Bluetooth, etc.) The tamper 80 includes at least a first wheel 82 and more typically a plurality of wheels 82. As presented the tamper 80 includes three wheels 82 that are selectively connectable to a frame 84 of the tamper. The ability to selectively attach the wheels 82 to the frame 84 allows for incorporating a number of compression wheels as specified by a manufacturer. Further, it will be appreciated that different wheels (e.g., width, diameter, density etc.) may be utilized based on required application parameters. As best illustrated in FIG. 3, the tamper 80 is positioned directly behind the tape application (i.e., relative to a direction of travel of the tape applicator vehicle). More specifically, the tamper is positioned behind the tape applicator 100 such that the wheels pass over the marking tape once the tape applicator 100 applied the tape to the roadway surface.

In the illustrated embodiment, the frame 84 of the tamper 80 connects to the tape applicator 100 via a movable (e.g., pivotal) coupling (not shown). To apply a predetermined compressive force to the wheels 82, the tamper utilizes a pneumatic actuator/cylinder 86 having a first end attached to the tape applicator and a second end attached to the tamper frame 84. The pneumatic cylinder 86 is connected to a source of pressurized air (not shown) to maintain a predetermined downward force of the tamper wheels 82. The compression sensor discussed in relation to FIG. 4, may be a pressure sensor that is disposed anywhere in pneumatic lines connecting the pneumatic cylinder to the pressurized air source (e.g., compressor). Based on the known pressure, known cylinder dimensions, and the size, number and/or position of the wheels 82, a compression force may be calculated for each wheel. Accordingly, the pressure may be adjusted to maintain a predetermined minimum compression force on each of the wheels. Further, this compression force may be recorded to the electronic record and/or output to an operator who may adjust the pressure as needed. Alternatively, the pressure may be automatically adjusted by the controller. Of note the tamper in combination with the tape applicator is considered novel by itself. Of further note, it will be appreciated that, while a pneumatic cylinder is utilized as the actuator in the illustrated embodiment, any controllable actuator may be utilized. Likewise, any sensor for monitoring the compression pressure may be utilized.

The foregoing description of the presented inventions has been presented for purposes of illustration and description. Furthermore, the description is not intended to limit the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. An application system for applying a marking tape to a roadway surface, comprising:
   a tape applicator configured to apply roadway marking tape to a roadway surface, the tape applicator attached to a tape application vehicle configured to travel over the roadway surface;
   at least a first environmental sensor configured to measure at least a first environmental parameter while the tape applicator applies roadway marking tape to the roadway surface;
   a location sensor configured to measure a geographic location of the tape application vehicle while the tape applicator applies roadway marking tape to the roadway surface;
   a controller operatively connected to the first environmental sensor and the location sensor, wherein the controller is configured to:
   record the first environmental parameter received from the environmental sensor indexed to the geographic location of the tape application vehicle to an electronic record.

2. The system of claim 1, wherein the first environmental sensor comprises a plurality of environmental sensors.

3. The system of claim 1, further comprising:
   a speed sensor configured to generate a speed output corresponding to a vehicle speed of the tape application vehicle while the tape applicator applies roadway marking tape to the roadway surface, wherein the controller is configured to record the vehicle speed to the electronic record.

4. The system of claim 1, wherein the controller is configured to compare the first environmental parameter to a threshold and, upon the first environmental parameter being outside the threshold, generate an output.

5. The system of claim 1, further comprising:
   a display operatively connected to the controller, wherein the display is configured to generate a display output of at least the first environmental parameter.

6. The system of claim 5, further comprising:
   an input operatively connected to the controller, the input configured to receive an operator input in response to the display output.

7. The system of claim 5, wherein the plurality of environmental sensors comprise at least two of:
   a surface moisture sensor;
   an ambient temperature sensor;
   a roadway surface temperature sensor; and
   a humidity sensor.

8. The system of claim 1, further comprising:
   a network interface.

9. The system of claim 8, wherein the controller is configured to acquire weather data from the network interface and record the weather data to the electronic record.

10. The system of claim 8, wherein the controller is configured to transmit the electronic record via the network interface.

11. The system of claim 1, further comprising:
   a tamper attached to the tape application vehicle, wherein the tamper has at least a first wheel that passes over the roadway marking tape after being applied to the roadway surface by the tape applicator.

12. The system of claim 11, further comprising:
   a compression sensor configured to measure a compaction pressure applied by the tamper to the roadway marking surface, wherein the controller is configured to record the compaction pressure to the electronic record.

13. The system of claim 11, wherein the controller is configured to alter the compaction pressure applied by the tamper.

14. A method for use with applying roadway marking tape to a roadway surface, comprising:
   applying roadway marking tape to a roadway surface using a tape applicator moving over the roadway surface;
   acquiring at least one environmental measurement while the roadway marking tape is being applied to the roadway surface;
   acquiring a geographical location measurement of the tape applicator while the roadway marking tape is being applied to the roadway surface;
   generating an electronic record that records the first environmental parameter indexed to the geographic location of the tape applicator.

15. The method of claim 14, further comprising:
   Measuring a speed that the tape applicator passes over the roadway surface and recording the speed to the electronic record.

16. The method of claim 14, further comprising:
   repeating the applying, acquiring, acquiring and generating steps a plurality of times for an application of the roadway marking tape, wherein the electronic record includes a plurality of entries for different geographic locations.

17. The method of claim 16, further comprising:
   comparing each of the plurality of entries to predetermined thresholds.

18. The method of claim 17, further comprising:
   generating an output indicating compliance or non-compliance based on the comparison.

19. The method of claim 17, further comprising:
   acquiring a plurality of environmental measurements, wherein each environmental measurement is recorded to the electronic record.

20. The method of claim 19, wherein acquiring a plurality of environmental measurements comprises measuring at least two of:
  a roadway surface moisture;
  an ambient temperature;
  a roadway surface temperature; and
  humidity sensor.

* * * * *